(12) United States Patent  (10) Patent No.: US 6,249,937 B1
Grenga  (45) Date of Patent: Jun. 26, 2001

(54) PARACHUTE CANOPY RELEASE (75) Inventor: Todd M. Grenga, Enfield, CT (US)

(73) Assignee: Capewell Components Company Limited Partnership, South Windsor, CT (US)

( * ) Notice: Subject to any disclaimer, the term of this patent is extended or adjusted under 35 U.S.C. 154(b) by 0 days.

(21) Appl. No.: 09/291,122

(22) Filed: Apr. 14, 1999

(51) Int. Cl.$^7$ .............................. A44B 11/25; B64D 17/32
(52) U.S. Cl. ........................ 24/573.6; 24/573.7; 24/602; 24/637; 24/645; 244/151 A
(58) Field of Search ................ 24/573.6, 573.7, 24/602, 603, 637, 645; 244/151 A (56) References Cited

U.S. PATENT DOCUMENTS

| | | | |
|---|---|---|---|
| 2,473,554 | 6/1949 | Warner et al. | 24/201 |
| 2,522,790 | 9/1950 | Johnston | 294/83 |
| 2,834,083 | 5/1958 | Newell et al. | 24/201 |
| 3,141,215 | 7/1964 | Turolla . | |
| 3,200,463 | 8/1965 | Craven et al. | 24/230 |
| 3,380,692 | 4/1968 | Gaylord | 244/151 |
| 3,426,985 * | 2/1969 | Pravaz | 24/573.6 |
| 3,453,702 | 7/1969 | Alofs | 24/230 |
| 4,030,689 | 6/1977 | Rodriguez | 244/151 B |
| 4,365,776 | 12/1982 | Gaylord et al. | 244/151 A |
| 4,612,687 * | 9/1986 | Barwood | 24/573.6 |
| 4,684,083 | 8/1987 | Maziarz | 244/151 A |
| 5,105,682 * | 4/1992 | Jung | 74/502.4 |

* cited by examiner

Primary Examiner—Victor N. Sakran
(74) Attorney, Agent, or Firm—Alix, Yale & Ristas, LLP (57) ABSTRACT

A low profile latch mechanism for use in existing and new parachute quick release couplings of the type having two nested members. The mechanism uses a U shaped latch connected to a lever. In an overlying position of the lever, the members are retained in the nested condition, preventing release of the coupling. A W-shaped spring biases tabs into engagement with apertures in one of the members. The lever is retained in the overlying position by connection with the W-shaped spring. Disengaging the W-shaped spring allows the lever to be pivoted, moving the U shaped latch to a position whereby the members are free to separate.

19 Claims, 7 Drawing Sheets

FIG. 7b

PARACHUTE CANOPY RELEASE

BACKGROUND OF THE INVENTION

The present invention relates generally to couplings having notable utility for connecting and quickly releasing a parachute canopy to a harness. More particularly, the invention relates to a new and improved latch mechanism for retaining the quick release coupling in a coupled condition.

A parachute canopy release comprises three major subassemblies: the base coupling member, the outer coupling member, and a latch mechanism which includes a cover. The outer coupling member is sewn permanently to the parachute risers and can not be changed. Consequently, there are large numbers of existing parachutes with these permanently attached outer coupling members. The base member is attached to the parachute harness. The base member is shaped to properly receive and nest or couple with the outer coupling member and therefore can not be changed without also changing the outer coupling member. During use, the outer coupling member is releasably nested with the base member so that the forces generated by the parachute can be transferred through the nested members to the harness. The latch mechanism and cover serves dual functions. In the overlying position it holds the members in the nested position, preventing accidental separation. In the release position, the mechanism allows quick and positive separation of the base and outer members.

The latch mechanism and cover is a significant concern in the design of parachute canopy releases. Previous latch mechanisms have extended above the outer member due to the design of their internal parts. Due to the position of the canopy release on the harness, prior latch mechanisms and their covers created a potential for impact with the wearer's chin during use. In addition, prior canopy releases have used latch mechanisms which contained a number of complex parts, requiring difficult and time consuming manufacturing and assembling steps. As in any life support equipment, reliability of the release coupling is a paramount concern. Finally, as is typical of aerospace applications, weight reduction is a serious consideration.

SUMMARY OF THE INVENTION

It is an object of the present invention to provide a parachute canopy release with a lower profile in the coupled position.

It is another object of the present invention to provide a parachute canopy latch mechanism and cover, which is simple to manufacture and assemble while still meeting the exacting reliability and actuation force requirements of previous latch mechanisms.

It is a further object of the present invention to provide a new and improved low profile parachute canopy latch mechanism and cover which can be retrofitted into existing parachute canopy releases.

The canopy release comprises a base coupling member secured to the parachute harness and an outer coupling member secured to the parachute riser. The coupling members are held in the nested position by a "U" shaped latch slide. The latch slide moves within grooves in the base member between a withdrawn position and a position overlying the outer member. In the overlying position the latch slide retains both members in the nested relationship. The latch slide is connected to an operating lever. When the operating lever overlies the outer coupling member, the latch slide is moved to its overlying position. When the operating lever is pivoted outwardly and downwardly, the latch slide is moved to the withdrawn position.

The lever is mounted to a "W" shaped spring. The outside arms of the W-shaped spring include tabs. When the operating lever is in the overlying position, the W-shaped spring fits within an outer member cavity and the tabs are biased into apertures within the cavity walls. With the operating lever in the overlying position and the spring tabs biased into the apertures, the canopy release is thereby latched together as a single unit.

A lock release fits between the W-shaped spring and the operating lever. When the lock release is moved, the outside arms of the W-shaped spring are compressed, thereby freeing the tabs from the apertures. Continued pulling of the lock release pivots the operating lever outwardly and downwardly, moving the U shaped latch slide to the withdrawn position.

Preferably the W-shaped spring is connected to the operating lever by a positioning block. The positioning block extends through a slot in the lock release, thereby slidably capturing the lock release between the positioning block and the operating lever. Also, the lock release may include a lanyard to ease actuation of the mechanism. The latch mechanism also includes a safety cover which snaps over the lanyard and operating lever to prevent accidental release.

In the preferred configuration, pulling on the lanyard moves the lock release, compressing the outside arms of the W-shaped spring, and freeing the tabs from the outer member apertures. Continued pulling on the lanyard causes the operating lever to pivot outwardly and downwardly, moving the latch slide to the withdrawn position. With the latch slide withdrawn, the coupling members are free to separate, thereby allowing separation of the parachute and harness.

Since the W-shaped spring fits within the outer coupling member and the positioning block extends only slightly above it, the height of the present latch mechanism is reduced when compared to prior assemblies. Since the height of the latch mechanism is reduced, the height of the safety cover which overlies this assembly may similarly be reduced. In addition, the parts of the present mechanism are simple in configuration and easily manufactured and assembled. These advantages are attained with the low profile latch mechanism meeting the same exacting reliability and actuation force requirements of previous latch mechanisms. Finally, the inventive latch mechanism and cover can be retrofitted into previously manufactured coupling members, thereby enhancing existing parachute canopy releases at minimal cost.

BRIEF DESCRIPTION OF THE DRAWINGS

Other objects and advantages of the invention will be evident to one of ordinary skill in the art from the following detailed description made with reference to the accompanying drawings, in which:

FIGS. 3a and 3b are enlarged top plan and side elevational views, respectively, of the positioning block and W-shaped spring lock of a low profile canopy release prior to assembly, while

FIG. 7b is a top plan view of the assembly of FIG. 7a.

DESCRIPTION OF THE PREFERRED EMBODIMENTS

The low profile canopy release of the present invention constitutes an improvement over the canopy release structures disclosed in U.S. Pat. Nos. 3,200,463 and 4,684,083. Except as described otherwise herein, the quick release coupling may be identical to the coupling disclosed in the above patents and therefore the disclosures of U.S. Pat. Nos. 3,200,463 and 4,684,083 are incorporated herein by reference.

Figure 1:
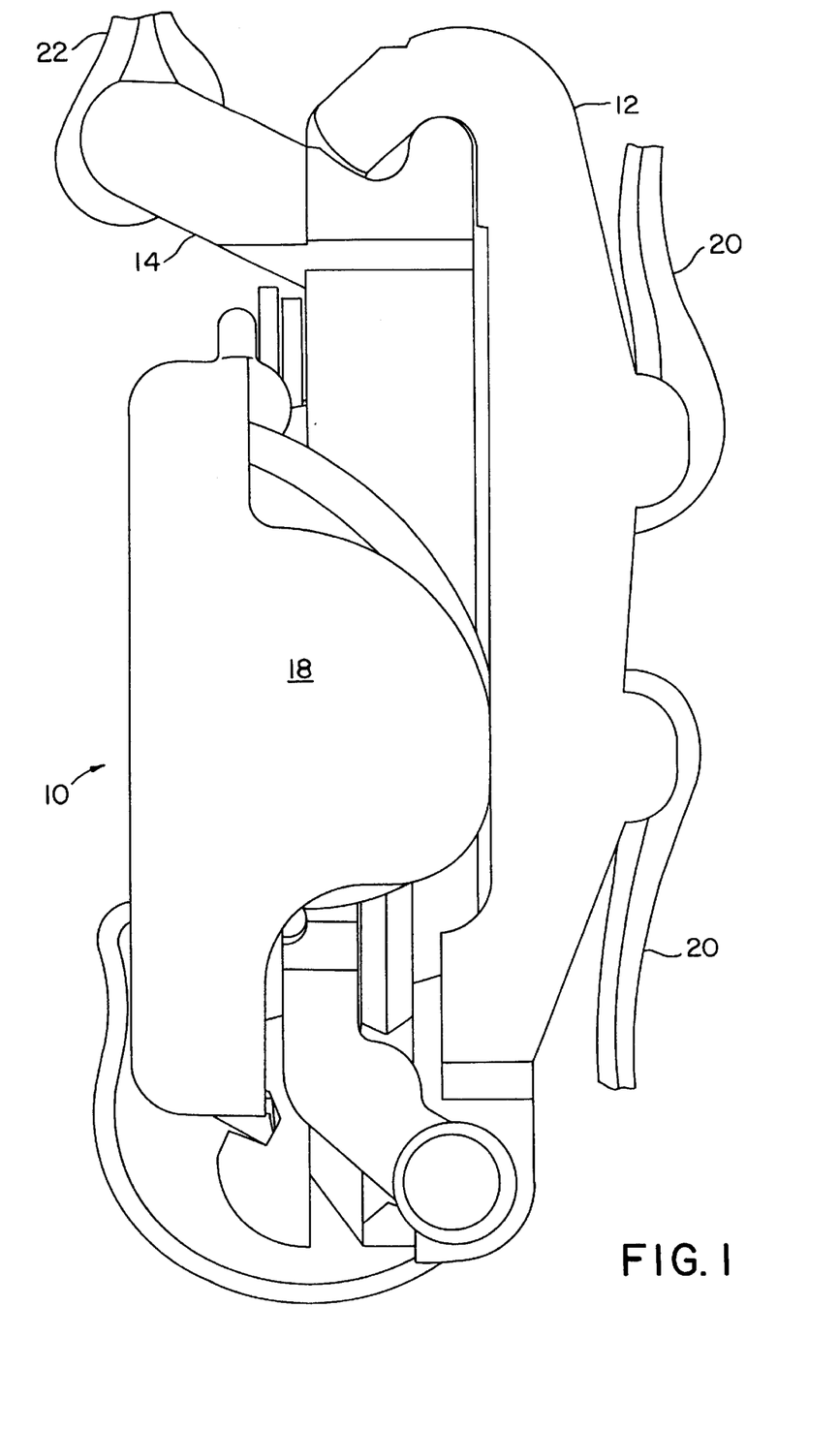
FIG. 1 is an enlarged side view of a parachute low profile canopy release in a typical use orientation showing the nested coupling members interconnecting a parachute harness and parachute canopy riser.

Referring now to the drawings wherein like reference numerals indicate like parts throughout the figures, a canopy release, generally designated as the numeral 10, is shown as comprising an underlying or base coupling member 12, an overlying or outer coupling member 14 and a releasable latch mechanism 16 (shown best in FIG. 6b) and cover 18 pivotally mounted to the base member 12. FIG. 1 shows the base and outer members 12, 14 in their nested position with the latch mechanism 16 and cover 18 overlying those members. Although only one canopy release 10 is shown and described herein, a parachute harness typically has a canopy release 10 at each side of the harness and both must be released to separate the parachute canopy. In a conventional manner, the underlying member 12 is secured to the straps 20 of the parachute harness and the overlying member 14 is secured to a canopy riser 22 of the parachute canopy (not shown). FIG. 1 is a side view of the low profile canopy release in a typical use position. Thus, the nested members form a link for connecting the canopy riser 22 to the parachute harness. Upon actuation of the latch mechanism 16 of each coupling 10 outwardly and downwardly, with reference to the in use position shown in FIG. 1, its outer member 14 is quickly released from its base member 12 to thereby separate the parachute canopy from the harness.

Figure 2:
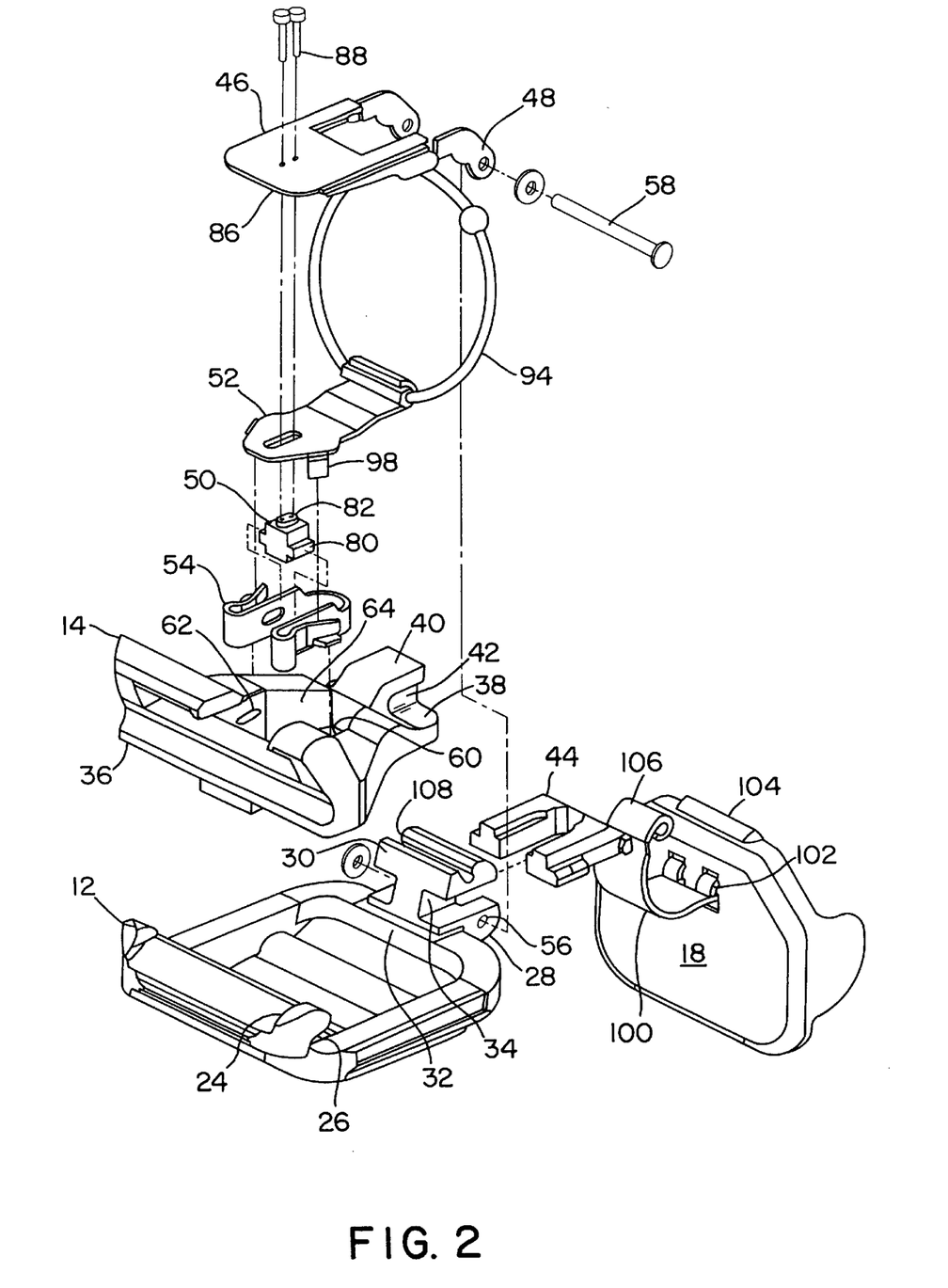
FIG. 2 is an exploded view of the low profile canopy release of FIG. 1.
Figure 3A:
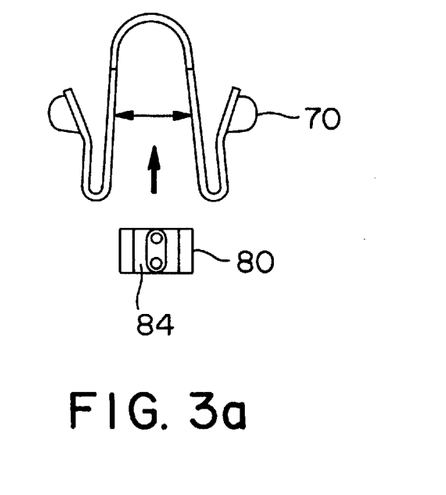
Figure 3B:
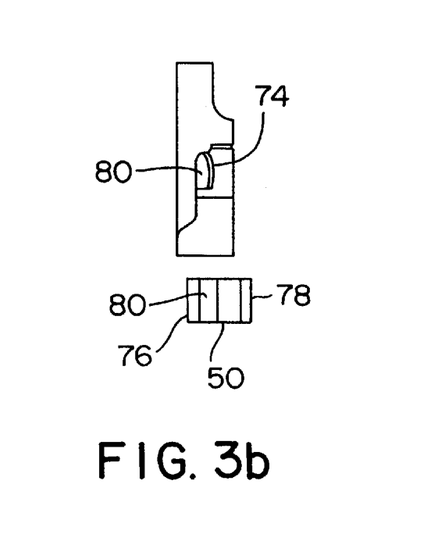
Figure 3C:
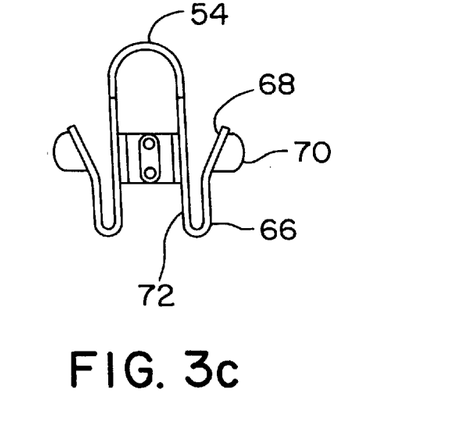
FIGS. 3c and 3d are corresponding views after assembly.
Figure 3D:
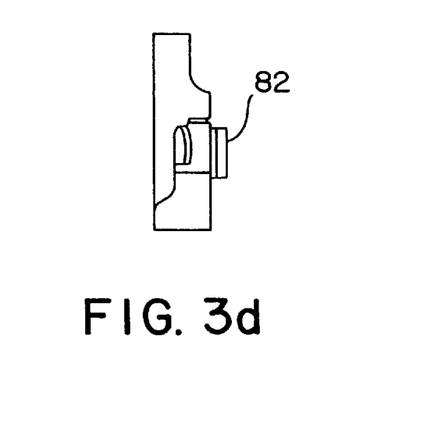

As shown in FIG. 2 and described more particularly in the incorporated patents, the base member 12 has an upper, outwardly and downwardly projecting end flange 24 providing a downwardly opening, concave bearing or groove 26 extending transversely substantially the full width of the base member 12. The groove 26 is effective for cooperatively retaining the overlying member 14. At the opposite or lower end 28 of the base member 12, an upstanding central lug 30 is provided and is spaced from the bearing 26 by an elongated recess 32. The base member upstanding lug 30 has a generally T-shaped cross-section forming parallel guide slots 34.

The outer member 14 has an upper lip 36 adapted to releasably engage the bearing 26 of the base member 12 and a lower end 38 received within the recess 32 in the base member 12 immediately adjacent the lower upstanding lug 30. The lower end 38 of the outer member 14 also has an upstanding generally T-shaped lug 40 forming shallow slots 42 aligned with the guide slots 34 when in the nested condition.

Figure 6A:
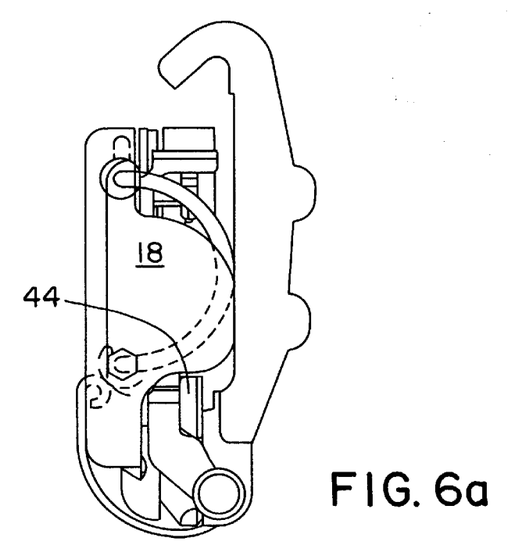
FIG. 6a is a side view, partly in phantom, of the low profile canopy release, with the outer coupling member deleted for clarity, showing the latch mechanism in its closed position
Figure 6B:
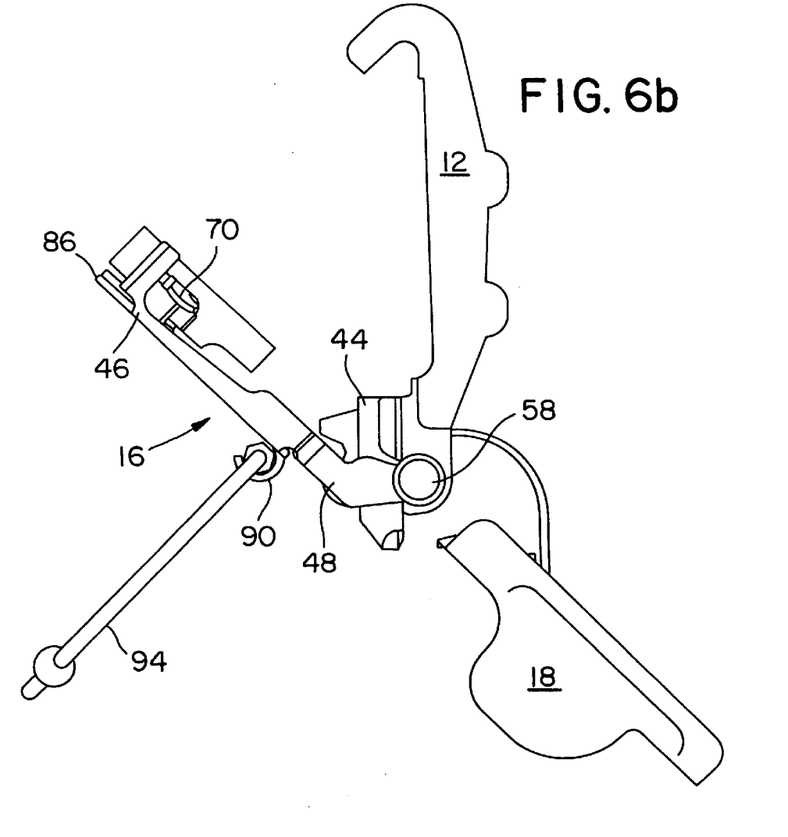
FIG. 6b is a side view of the low profile canopy release of FIG. 6a showing the latch mechanism in the withdrawn or release position.

The members are held in the nested position by a "U" shaped latch slide 44. The latch slide 44 is slidable in the base member guide slots 34 between an overlying or latching position shown in FIG. 6a and a withdrawn position or release position as shown in FIG. 6b.

In the latching position, the free ends of the latch slide 44 extend beyond guide slots 34, engage slots 42 and overlie the lower end 38 of the outer member 14, thereby securing the members in the nested position. Upon movement of the latch slide 44 to its withdrawn position and out of engagement with the outer member 14, the outer member 14 is released to pivot freely about the bearing 26 and separate from the base member 12.

The latch slide 44 is loosely trapped between the parallel arms 48 of an operating lever 46. The operating lever 46 is part of a releasable latch mechanism 16 which pivots with the operating lever 46. The latch mechanism 16 also includes a positioning block 50, a lock release 52 and a W-shaped spring lock 54. The latch slide 44 is thereby operably connected to be shifted between its upper overlying position and lower withdrawn position by operation of the releasable latch mechanism 16.

The operating lever 46 is mounted to the base member 12 for pivotal movement. The parallel arms 48 of the lever 46 are interconnected to spaced transverse apertures 56 in the lower end 28 of the base member 12 by a pivot pin 58. The lever 46 can pivot, from a position overlying the outer member 14, shown in FIG. 6a, to a withdrawn position disposed generally outwardly and downwardly, with reference to the use position of the canopy release, from the base member 12.

Figure 4:
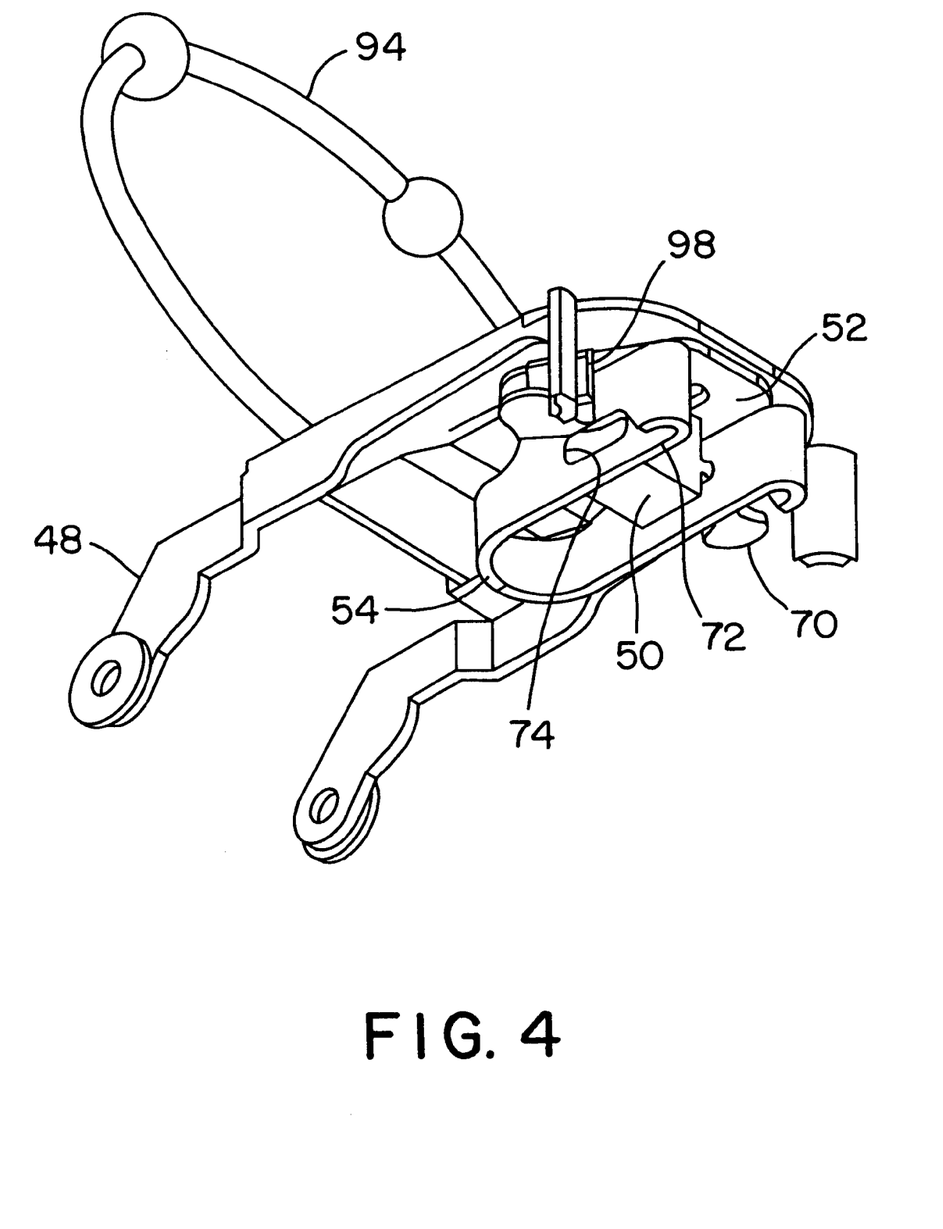
FIG. 4 is a perspective view of the underside of an operating lever of the canopy release showing the assembled W-shaped spring and positioning block mounted thereon, and also showing parts of the lock release with attached lanyard.
Figure 5:
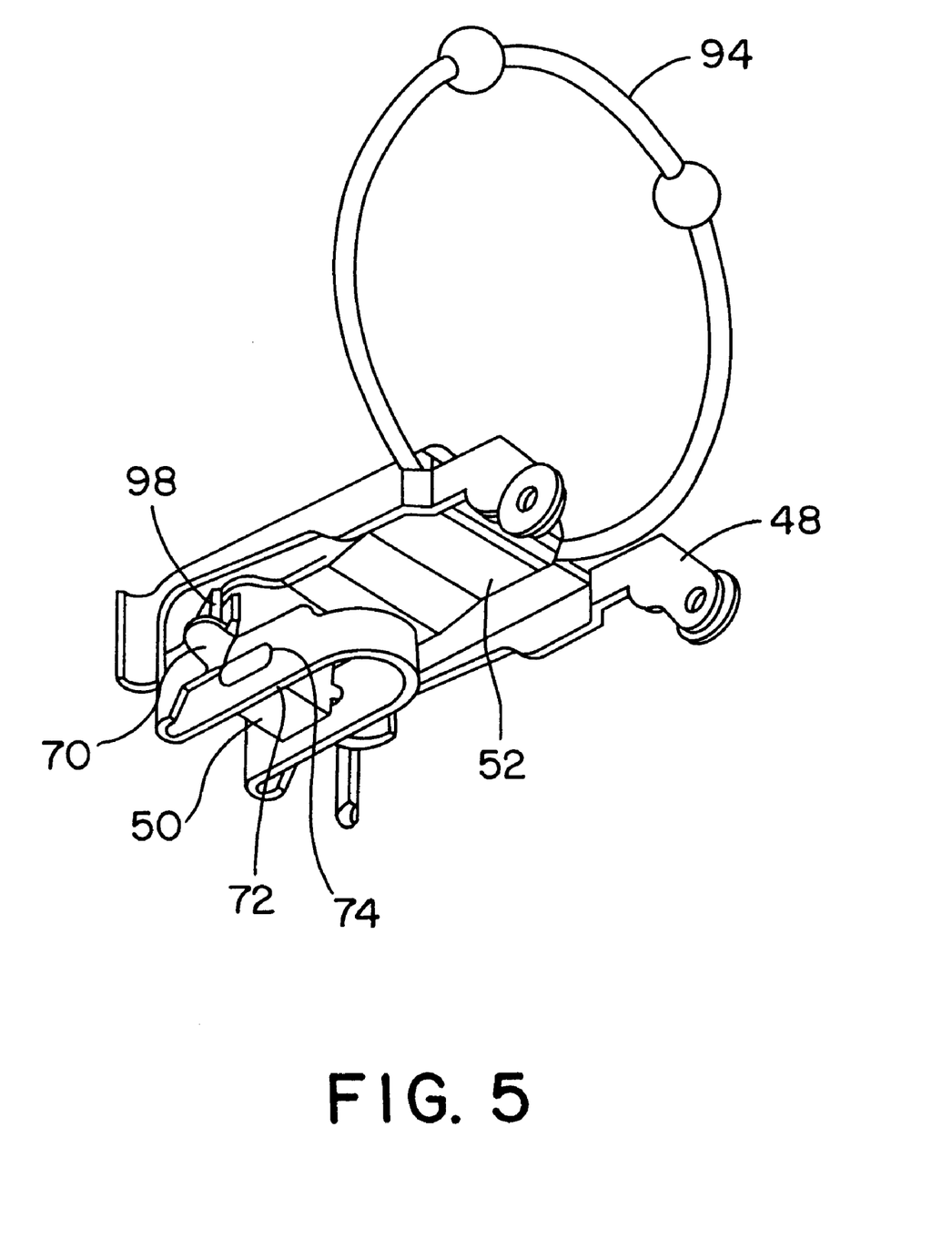
FIG. 5 is a perspective view of the mechanism of FIG. 4 taken from the opposite end.
Figure 7A:
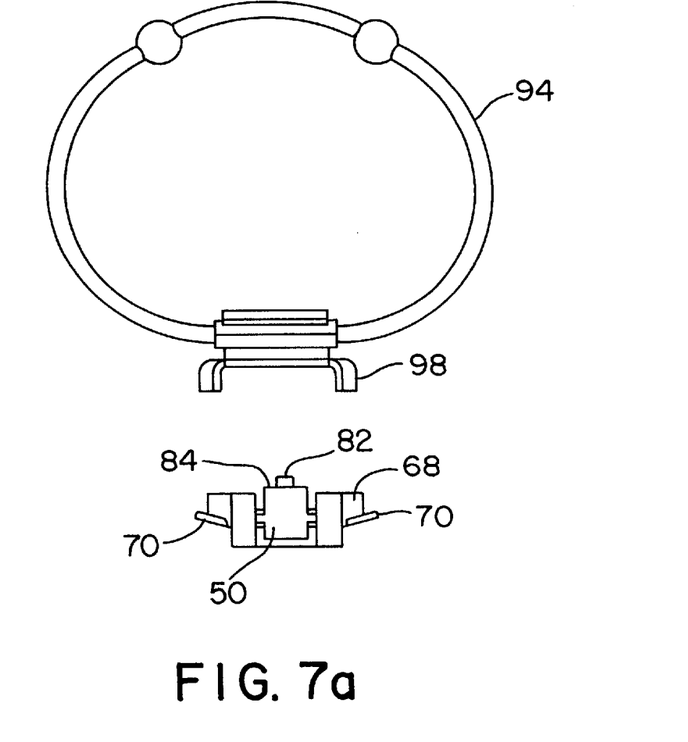
FIG. 7a is an exploded end view showing the positioning of the lock release over the W-shaped spring and positioning block combination.
Figure 7B:
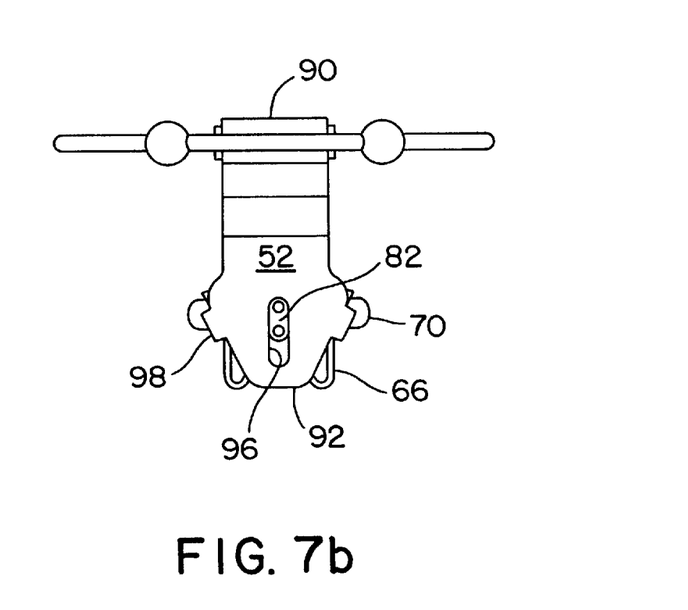

The outer coupling member 14 has an internal central cavity 60 intermediate upper lip 36 and lower end 38. The cavity has opposing slots 62 provided in the cavity wall 64. A "W" shaped spring lock 54 is positionable within the cavity 60. The outside arms 66 of the W-shaped spring lock 54 each include an outwardly bent tab support 68 and a tab 70 (best shown in FIGS. 3 and 7) which is biased into a cavity slot 62, thereby securing the W-shaped spring lock 54 to the outer member 14. Preferably, the tabs 70 are angled outwardly as shown in FIG. 7, to further secure the W-shaped spring lock 54 to the outer member 14. The inner arms 72 of the W-shaped spring lock 54 are provided with apertures 74 (see FIGS. 4 and 5).

A positioning block 50 has opposing bottom and top ends 76, 78 and opposing side projections 80 adjacent the bottom end 76. The block fits between the inner arms 72 of the W-shaped spring lock 54, (as shown in FIG. 3) with the projections 80 received within the inner arm apertures 74, thereby joining the positioning block 50 to the W-shaped spring lock 54. The positioning block top end 78 includes an upstanding boss portion 82 and a top sliding surface 84 generally orthogonal to the upstanding boss portion 82. The planar upper end 86 of the operating lever 46 is attached to the upstanding portion 82 as shown in FIG. 2. The attachment may be, for example, with threaded fasteners 88.

A lock release 52, shown best in FIGS. 2 or 7b, is generally tongue shaped with a lower end 90 and an upper end 92. The lower end 90 securely anchors a lanyard 94. The upper end 92 of the lock release 52 contains an elongated slot 96 extending along the longitudinal axis of the lock release, and a pair of depending flanges 98 projecting at an angle to the longitudinal axis of the lock release. Preferably, the angle of the depending flanges 98 is complementary to the angle of the outwardly bent tab supports 68 so that a camming relationship is established. As shown in FIGS. 7a and 7b, the elongated slot 96 of the lock release 52 receives the upstanding portion 82 of the positioning block 50. The lock release 52 is thereby trapped between the sliding surface 84 of the positioning block 50 and the overlying operating lever 46, and restricted to longitudinal movement relative to a first lock position and a second release position by the upstanding portion 82 within the slot.

In the lock release first or lock position, shown in FIG. 7b, the depending flanges 98 are positioned outwardly of and are adjacent to the W-shaped spring outwardly bent tab support 68. As the lock release 52 is moved from the first position downwardly toward the second position, the depending flanges 98 cammingly engage the outwardly bent surfaces of the tab support 68 and compress the exterior arms 66 of the W-shaped spring lock 54, driving inwardly the tabs 70, whereby the tabs are released from the slots 62 defined within the outer coupling member cavity 60. Continued tension on the lock release 52 outwardly and downwardly pivots the latch operating lever 46 outwardly and downwardly to the withdrawn position, thereby simultaneously moving the latch slide 44 to the withdrawn position and releasing the nested members 12,14.

To facilitate sliding of the lock release 52 and pivoting of the operating lever 46, a "pop-up" lanyard 94 is fixed to the lower end 90 of the lock release 52. The lanyard 94 provides an easily gripped attachment for sliding the lock release 52 and pivoting the operating lever 46 outwardly and downwardly.

It should be noted that the W-shaped spring lock 54 is substantially, and may be completely, contained within the outer member cavity 60. Further, the positioning block 50 allows attachment of the operating lever 46 to the W-shaped spring lock 54 in a compact yet effective manner. The lock release 52, with its depending cam flanges 98, its positioning between the position block 50 and operating lever 46 and its longitudinal, sliding movement works in synergism with the other elements in the latch assembly 16 to keep the assembly 10 as compact as possible. The net result of this unique arrangement is the creation of a low profile latch assembly which is more compact than previous latch assemblies while retaining functionality with pre-existing coupling members.

As seen in FIGS. 1 and 6a, the safety cover 18 in the overlying position covers the lanyard 94 and operating lever 46 so as to preclude accidental release of the coupling. Referring to FIG. 2, the safety cover 18 is connected to the pivot pin 58 via an interconnecting resilient link or strap 100. The upper end 102 of the strap 100 is pivotally connected to the cover 18 above a lower pivotal edge 104 of the cover. The strap 100 is formed with a generally cylindrical lower end 106. The base member lower end 28 is formed with a pair of spaced transverse apertures 56 for engagement by the pivot pin 58. The generally cylindrical lower end 106 of the strap 100 fits between the spaced apertures 56 and encircles the pivot pin 58.

For mounting the cover 18 in its closed position, the lower edge 104 of the cover 18 is positioned in a transverse groove 108 in the outer face of the upstanding lug 30 and the safety cover 18 is pivoted upwardly and inwardly into an overlying relationship with the operating lever 46 and lanyard 94. In the overlying position, the cover 18 is held by an over center bias provided by the resilient strap 100. The safety cover 18 can be manually withdrawn from its closed position by pivoting outwardly and downwardly, as shown in FIG. 6b. The lanyard 94 will then "pop up" to an upright position where it can be easily grasped.

To separate the members 12, 14 in use, the safety cover 18 is pivoted outwardly and downwardly around the transverse groove 108 so that it is away from the canopy release 10. The lanyard 94 will then "pop up" to an upright position where it can be easily grasped. The lanyard 94 is pulled downwardly, which slides the lock release 52 toward the second or release position. As the lock release 52 slides toward the second position, the depending flanges 98 engage and compress the outwardly bent tab supports 68 of the W-shaped lock 54, freeing the tabs 70 from the slots 62 defined in the outer member cavity 60. Continued pulling of the lanyard 94 pivots the operating lever 46 outwardly and downwardly to the withdrawn position, simultaneously retracting the latch slide 44. With the latch slide 44 retracted, the outer member 14 can rotate around the base member bearing 26 and separate from the base member 12.

Accordingly, a canopy release is provided which affords a simple and quick uncoupling operation with reduced height, weight and complexity while retaining the exacting reliability and actuation force characteristics of previous designs. The safety and convenience of the user are thereby enhanced. Further, these improvements may be retrofitted to existing canopy releases.

As will be apparent to persons skilled in the art, various modifications and adaptations of the structure above described will become readily apparent without departure from the spirit and scope of the invention, the scope of which is defined in the appended claims.

What is claimed is:

1. In a quick release connector comprising nested base and outer members, one of said members having a shoulder portion and each having a separated condition, a latch mechanism comprising:

a latch slidably engaged with the base member and having a latched position overlying the nested outer member and a release position removed from the nested outer member;

a lever operatively connected to the latch and pivotable between a position overlying the nested members and a release position;

a detent mounted to said lever and biased into engagement with said corresponding shoulder portion on one of said nested members when said lever is in said overlying position; and a lock release underlying and generally parallel to the lever, said lock release slidable between a first position and a second position;

wherein sliding the lock release toward the second position disengages the detent, allowing the lever to pivot to said lever release position and slide the latch to said latch release position, thereby allowing the members to separate.

2. A quick release connector as in claim 1 further including a positioning block, said block connecting the lever to the detent.

3. A quick release connector as in claim 1, wherein the lever is pivotably connected to one of said base or outer members.

4. A quick release connector as in claim 1, wherein the detent is biased by a spring, said spring being substantially contained within a cavity defined inside a separable member.

5. A quick release connector as in claim 4, wherein the spring includes arms, at least two arms each further including a detent.

6. A quick release connector as in claim 4, wherein the lock release is slidably captured between the spring and the lever.

7. A quick release connector as in claim 6, wherein the lock release slides in a direction generally parallel with a longitudinal axis of the lever.

8. A quick release connector as in claim 1, wherein the lock release includes a depending drive flange for releasing said detent.

9. A quick release connector as in claim 1, wherein the lock release disengages the detent and pivots the lever toward a release position.

10. A quick release connector as in claim 1, wherein said base and outer members each include means for attachment to a strap or webbing.

11. A low profile parachute canopy release, comprising:
a base coupling member having an upper end comprising an inwardly facing bearing surface and a spaced lower end, said lower end defining a guide slot and a transverse aperture;
an outer coupling member having spaced upper and lower ends and an internal wall defining a cavity, said outer member upper end interlocking within said base member bearing surface, said outer member lower end fitting within and abutting said base member lower end in a coupled condition, wherein movement of said outer member lower end is required for uncoupling;
a latch slidable within said base member guide slot, from a first position overlying said outer member lower end wherein uncoupling is prevented to a second position retracted from said outer member lower end wherein uncoupling is permitted;
a lever pivotally attached to said base member lower end, said lever pivoting between a position overlying said coupled members and a release position;
a driving connection between said U shaped latch and said lever, wherein moving said lever from said overlying position to said release position moves said latch from said overlying position to said retracted position;
lock means comprising means for biasing the lock means, both said lock means and said biasing means contained substantially within said outer member cavity and releasably secured to said outer member in the coupled condition for locking said lever in the overlying position;
connecting means for connecting said lock means to said lever;
lock release means for releasing said lock means; and
a safety cover having a lower edge portion pivotal on said base member to pivot said cover to a close position overlying said lever and lock release means, and a connector mounted to the cover above its lower edge portion and to the base member lower end to provide an over center resilient bias for retaining the cover in said close position.

12. A parachute canopy release as in claim 11, wherein said lock release means includes a lanyard.

13. A parachute canopy release as in claim 11, wherein said lock release means is operative to release said lock means and pivot said lever to said release position.

14. A parachute canopy release as in claim 11, wherein said base member and said outer member each include means for attachment to a strap or webbing.

15. A parachute canopy release as in claim 11, wherein:
said outer member wall further defines tab receiving apertures;
said lock means includes tab supports mounting locking tabs for movement into said wall apertures for locking the canopy release; and
said lock release means includes a tongue shaped member slidable relative to said lever between a first position and a second position, said tongue shaped member having a pair of depending flanges engaging said tab supports,
wherein said flanges in said first position allow retention of said tabs within said apertures and said flanges in said second position hold said tabs away from said wall apertures.

16. A parachute canopy release as in claim 15, wherein said biasing means comprises a W-shaped spring and the W-shaped spring biases said tongue shaped member into said first position.

17. A parachute canopy release as in claim 11, wherein:
said connecting means comprises a positioning block having a sliding surface and an upstanding portion projecting from said sliding surface, said upstanding portion connecting to said lever; and
said tongue shaped member defines an elongated slot surrounding said upstanding portion.

18. A parachute canopy release as in claim 17, wherein:
said biasing means comprises a W-shaped spring having inside arms defining apertures; and
said positioning block further comprises projections, said projections fitting within said inside arm apertures.

19. In a parachute canopy release of the type comprising a base coupling member having an upper end including an inwardly facing bearing surface and a spaced lower end, said lower end defining a pair of guide slots and a pair of transverse apertures; an outer coupling member with a wall defining an internal cavity with a plurality of shoulders and having opposing upper and lower ends; wherein said outer member upper end interlocks within said base member bearing surface, said outer member lower end fits within and abuts said base member lower end in a coupled condition and rotation of said outer member lower end around said base member bearing surface is required for uncoupling; a U shaped latch slidable within said base member guide slots from a first position overlying said outer member lower end wherein uncoupling is prevented to a second position retracted from said outer member lower end wherein uncoupling is permitted; a replacement locking system, comprising:
a lever pivotally attached to said base member transverse apertures, said lever pivoting between a position overlying said coupled members and a release position;
a driving connection between said U shaped latch and said lever, wherein moving said lever from said overlying position to said release position moves said U shaped latch from said overlying position to said retracted position;
a positioning block with a sliding surface and an upstanding portion projecting from said sliding surface at a first end and an opposing second end, said upstanding portion attached to said lever;
a W-shaped spring mounted to said positioning block second end and including tabs projecting from each outside arm of said spring, said tabs biased into said coupled outer member shoulders when said lever is in said overlying position; and an elongated lock release defining an elongated slot surrounding said upstanding portion and slidably captured between said lever and said positioning block sliding surface, said lock release slidable between a first position and a second position, said lock release including a plurality of depending flanges engaging said outside arms, wherein in said first position said flanges allow said outside arms to bias said tabs into said shoulders and in said second position said flanges compress said outside arms, releasing said tabs from said shoulders, allowing said lever to pivot toward said release position and drive said U shaped latch toward said retracted position, thereby allowing said members to separate.

* * * * *